Dec. 9, 1969     M. J. CAREY     3,482,319
PERCENTAGE MEASURING DEVICE
Filed Sept. 26, 1966
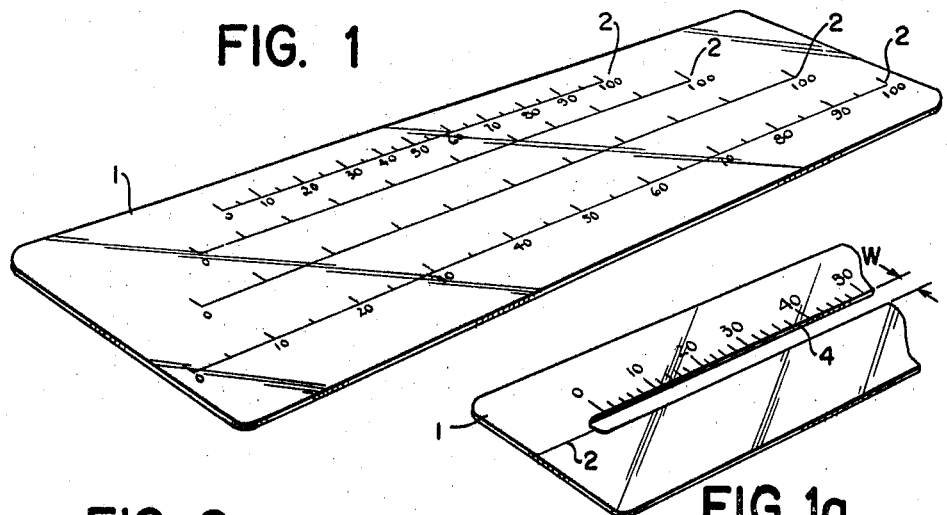
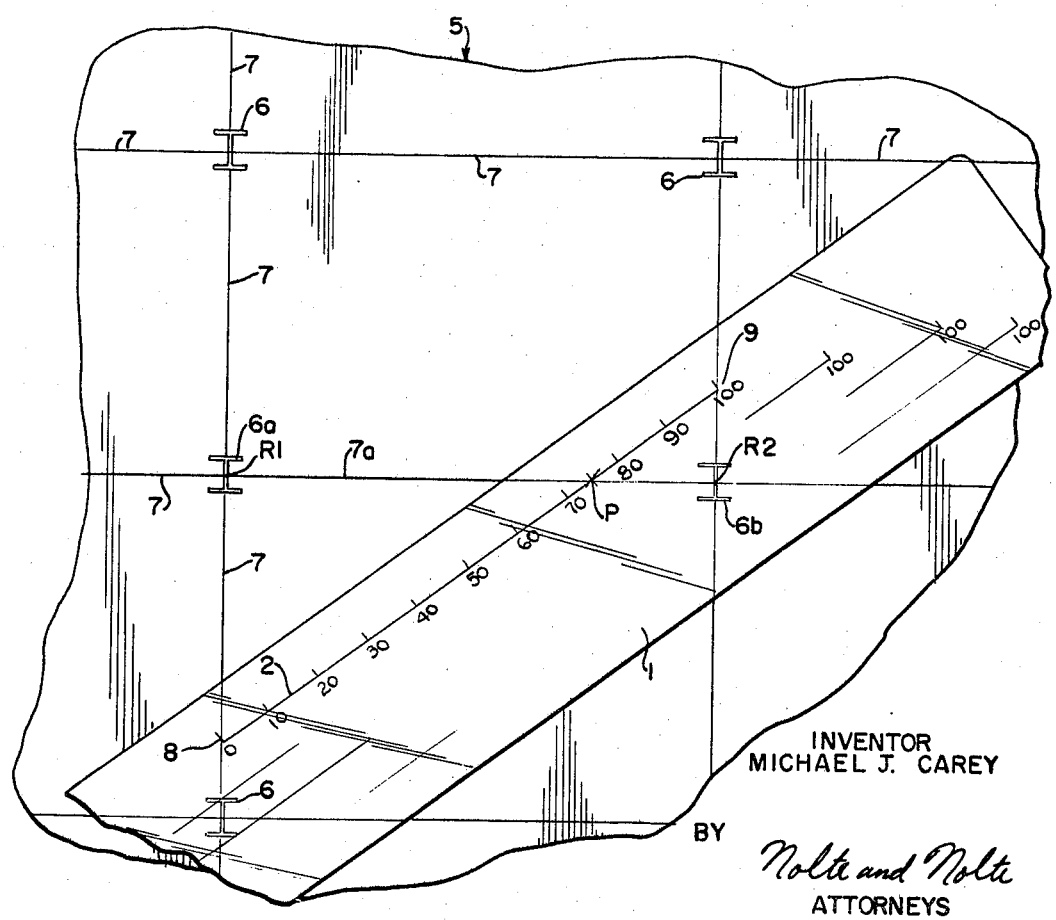
INVENTOR
MICHAEL J. CAREY
BY Nolte and Nolte
ATTORNEYS

United States Patent Office 3,482,319
Patented Dec. 9, 1969

3,482,319
PERCENTAGE MEASURING DEVICE
Michael J. Carey, 120 W. 183rd St., Bronx, N.Y. 10453
Filed Sept. 26, 1966, Ser. No. 582,077
Int. Cl. G01b *3/00;* B43l *7/00*
U.S. Cl. 33—111                    1 Claim

ABSTRACT OF THE DISCLOSURE

The present invention includes a transparent sheet percentage measuring scale including a plurailty of scales each numbered from zero to one hundred and each of a different length from another of said plurality of scales, the sheet being formed with a slot for positioning the sheet with respect to a supporting surface, the scale enabling the user to visually determine load data from a drawing.

---

This invention relates to the analysis of beam loading reactions and more particularly to a device for visually and graphically determining the percentage of a load on a beam supported by *reaction members*.

In the analysis of structures, stress analysists and draftsmen are faced with the problem of isolating individual members of a structure and considering the loads and the reactions to such loads on connecting members. In the case of beams, where known loads are acting on such beams, the reactions at members supporting the load can be calculated by long hand as, in the case of simply supported beams, by algebraically taking the summation of moments about each reaction. This is time consuming and costly when considering the number of beams present in many of the larger structures being designed today.

Solutions of this problem have mainfested themselves in the creation of tabulations and charts wherein a representative schematic picture of the load conditions approximating the particular case under consideration are accompanied by simplified formulas for determining reactions, moments, maximum moments, and shear and bending stresses induced by the loads. These charts and tabulations are well known to the art, however, several limitations and disadvantages of the prior art solutions are evident. Among these is the need to determine, in the case of simply supported beams, the distance of concentrated loads from supporting members. This has been necessary to determine since when applying the aformentioned formulas given in the tables, values for moment arms must be determined and inserted. Furthermore, assuming the designer is furnished with all of the necessary information required to analyze a simple beam problem, an arithmetic or algebraic calculation is still necessary, requiring a slide rule, scratch paper or reference books.

A primary object of the present invention is to provide a device for visually and graphically determining the percentage of loads on beams transmitted to each reaction.

A further object of the present invention is to eliminate the need for scaling or measuring the distance of concentrated loads on beams from respective reaction points.

A still further object of the present invention is to visually and graphically solve simply supported beam problems very rapidly, completely disregarding the dimensions of the structure and the relative spacing or point loads with respect to the structure itself.

The present invention fulfills the aforementioned objects and overcomes the limitations and disadvantages of prior art solutions by providing a template or indicator for use by the structural designer or analyst in conjunction with structural drawings which are drawn to any scale. The template may be made of a sheet of transparent plastic or other suitable material.

The present invention is based upon the geometric relationship of similar right triangles such that the hypotenuse of one such triangle may be given a percentage value equal to 100% minus the percentage value given to the hypotenuse of the other where equal acute angles are formed by the intersection of the base and hypotenuse of each triangle which meet at a common point, the sides of said triangles subtending said equal acute angles being parallel.

At least one percentage scale, showing equally spaced increments, preferable from 0% to 100%, is arranged on the template and preferably three or four percentage scales of varying length may be provided for purposes which will be discussed. The scale or scales may be printed, etched or applied by any other suitable means to the surface of the sheet.

The percentage scales are of either arbitrary or predetermined length and are subdivided into increments suitable for visual indication. The lengths of the percentage scales will facilitate the user to apply the template and use it on drawings having varying scales, or, in the case of exceptionally long or short members being analyzed, a suitable length scale may be selected.

In use, the template is placed upon a structural drawing which has been drawn to any scale and illustrates the structural members to be analyzed. The percentage scale, which must be of sufficient length, is placed such that the line representing the scale passes through the point at which the concentrated load is acting upon the member being analyzed. The template is then moved so that points 0% and 100% on the scale lie upon lines (which may be supplied by the user) extending perpendicularly with respect to the member to be analyzed and through the reactions which are supporting the concentrated load. Thus, once points 0% and 100% lie on said perpendicular lines with the line representing the percentage scale passing through the point load, the intersection of the member with the scale will give the user a percentage reading which will correspond to the percentage of the concentrated load carried by the respective reactions. For simply supported beams, the higher percentage is attributed to the reaction point closer to the concentrated load.

The invention will be best understood from the following description of specific embodiments of the invention together with the accompanying drawings, in which:

FIG. 1 is a perspective view of one embodiment of the present invention;

FIG. 1A is a perspective view, partially broken away, of another embodiment of the invention;

FIG. 2 is a plan view of the present invention in a position upon a structural drawing in which a reading can be taken, and eliminating details of percentage scales not used in the solution of the problem being solved in the figure.

FIG. 1 shows a template 1 embodying the present invention in the form of a relatively thin sheet of transparent plastic or other suitable material on which percentage scales 2 are printed. Scales 2 may be etched or molded or formed in any suitable manner on template 1. In another embodiment shown in FIG. 1A, scales 2a consist of a slot 4 through template 1a. Width W of slot 4 may be wide enough to enable an ordinary pencil point to touch the surface on which template 1a is resting.

Percentage scales 2, 2a are labeled with indicia corresponding to equally spaced increments thereof. For larger scales, greater subdivisions may be indicated. Fractions indicating the scale of blueprints are not at all necessary with the present invention, although the user may use them.

FIG. 2 shows template 1 positioned on structural drawing 5 in which columns 6 are indicated in cross section and beams 7 are indicated by center lines.

In FIG. 2, point P represents the point of application of a concentrated point load on beams 7a. Columns 6a, and 6b are the structural reaction members supporting the concentrated load at point P. Reaction points R1 and R2 represent the theoretical reaction points. Structural drawing 5 consists of intersecting perpendicular lines, 7, which represent beams and conveniently provide guide lines which facilitate the use of the present invention. Where perpendicular lines are not present, they can easily be drawn in or the invention is capable of being used with conventional drafting tools such as protractors and triangles.

The following example will indicate the visual and graphical determination of the percentage of the concentrated load at point P supported by reaction members 6a and 6b at points R1 and R2 respectively. Template 1 is positioned on drawing or blueprint 5 such that percentage scale 2 intersects point P and points 0% and 100% on percentage scale 2 lie on lines extending perpendicularly through points R1 and R2 at points 8 and 9 respectively. It is seen in FIG. 2 that beam 7a intersects percentage scale 2 at point P below a point on the scale corresponding to the value of 75% on scale 2. The user is thus visually and graphically informed that column or reaction member 6b supports 75% of the concentrated load acting on beam 7a at point P. Those even moderately skilled in the art will recognize that since the load at point P is closer to point R2 than R1, member 6b will carry a higher percentage of the load.

The embodiment shown in FIG. 1A further facilitates the use of the present invention by lessening the time required to position sheet 1 on a drawing or blueprint. By placing groove 4 of the scale desired over the point of application of the concentrated load as indicated on the blueprint, and by placing a pencil point or other instrument through groove 4 to the paper underneath, the pencil or instrument will form a pivot point facilitating the sliding and rotating of the scale so as to quickly align points 0% and 100% of the percentage scale on the perpendicular lines passing through the reaction points. The advantage of this embodiment resides in the fact that once the pencil point is positioned through slot 4, only two points are required to be aligned, whereas in the embodiment in which the percentage scales 2 are printed on sheet 1, three positioning points must be located.

Thus it is seen that by the example given, if it is assumed that a 1,000 pound concentrated load is acting at point P on simply supported beam 7a supported at reaction points R1 and R2, 75% or 750 pounds of the 1,000 pound load will be supported by member 6b, point R2 and the mechanical properties of the supporting member may be determined accordingly.

The present invention is not limited to the use of templates, and percentage readings can be taken by optical methods, for instance. Among these would be the use of a lamp and indicia bearing shield (not shown) wherein an image created by light means is cast upon the media on which the user is working. Also instruments including sighting apparatus may include the percentage scale of the invention within the viewing area.

Thus it is also seen that, if used on a drawing not dimensioned, but drawn to a reasonably accurate scale, the present invention eliminates the need for the designer to scale two distances (beam length and distance of the load from one end of the beam) in determining each load on a beam, and one slide rule operation need only be performed.

The embodiments of the invention particularly described are presented merely as examples of how the invention may be applied. Other embodiments, forms and modifications of the invention will of course readily suggest themselves to those skilled in the art.

What is claimed is:

1. A method of determining the magnitude of a reaction to a load applied to a structural element such as a beam, said structural element being graphically represented indicating the location of said load and reactions along the length thereof and further indicating straight guide lines intersecting said reaction points perpendicularly with respect to said structural element, said method comprising the steps of: placing a transparent sheet member over said graphical representation, said sheet member including a scale indicated thereon and being equally subdivided between values of zero and one hundred, said sheet member further formed with a slot extending along said scale such that the subdivisions abut one edge of the slot, placing a pivot element through said slot onto the point representing the load, said pivot element forming a fulcrum, simultaneously sliding and pivoting said sheet member against said pivot element until said zero and one hundred values overlie said guide lines, and visually reading the proportional magnitude of a reaction.

References Cited

UNITED STATES PATENTS 1,497,492  6/1924  Engel _____ 33—111
2,445,011  7/1948  Twichell _____ 33—111 X HARRY N. HAROIAN, Primary Examiner